United States Patent [19]

Peddie et al.

[11] 4,385,241
[45] May 24, 1983

[54] A.C. ELECTRICITY POWER SUPPLY SYSTEM AND METHODS OF AND APPARATUS FOR LOAD CONTROL THEREON

[75] Inventors: Robert A. Peddie, Reigate; John S. Fielden, Ottery St. Mary, both of England

[73] Assignee: South Eastern Electricity Board, England

[21] Appl. No.: 282,904

[22] Filed: Jul. 13, 1981

[30] Foreign Application Priority Data

Jul. 14, 1980 [GB] United Kingdom ............... 8023007

[51] Int. Cl.³ ............................................. H02J 13/00
[52] U.S. Cl. ........................................................ 307/39
[58] Field of Search ................ 307/31, 34, 35, 113, 307/38–40; 364/492, 493; 340/310 A

[56] References Cited

U.S. PATENT DOCUMENTS

| 3,529,215 | 9/1970 | Xavier et al. | 317/147 |
| 3,866,019 | 2/1975 | Cartier et al. | 219/485 |
| 4,064,485 | 12/1977 | Leyde | 307/39 |
| 4,100,426 | 7/1978 | Baranowski et al. | 307/35 X |
| 4,245,319 | 1/1981 | Hedges | 307/31 X |
| 4,246,492 | 1/1981 | Vandling | 307/40 |
| 4,317,049 | 2/1982 | Schweppe | 307/39 |

FOREIGN PATENT DOCUMENTS

| 1017057 | 9/1952 | France . |
| 1593400 | 5/1970 | France . |
| 367512 | 2/1932 | United Kingdom . |
| 553183 | 5/1943 | United Kingdom . |
| 629359 | 9/1949 | United Kingdom . |
| 695816 | 8/1953 | United Kingdom . |
| 712824 | 8/1954 | United Kingdom . |
| 712850 | 8/1954 | United Kingdom . |
| 713452 | 8/1954 | United Kingdom . |

OTHER PUBLICATIONS

IEEE Frequency Actuated Load Shedding and Restoration, Jul.–Aug. 1971, pp. 1460 to 1468, vol. 90, No. 4.

Primary Examiner—Donald A. Griffin
Attorney, Agent, or Firm—Beveridge, DeGrandi & Kline

[57] ABSTRACT

In an a.c. electricity power supply system, to guard against a "blackout", that is to say a cumulative supply failure caused by a fault leading to generating stations being overloaded and having to cease supplying a network, consumers are each provided with means responsive to the supply frequency and operative to reduce or cut out the consumer's load when the supply frequency falls below a predetermined value, which may be different for different consumers.

10 Claims, 3 Drawing Figures

A.C. ELECTRICITY POWER SUPPLY SYSTEM AND METHODS OF AND APPARATUS FOR LOAD CONTROL THEREON

BACKGROUND OF THE INVENTION

1. Field of the Invention

This invention relates to a.c. electricity power supply systems and to methods of and apparatus for controlling the load thereon.

In some parts of the world, there have in recent years been widespread power failures lasting many hours arising from the power demand exceeding the supply. Such failures can occur particularly in systems which are not strongly interconnected and where, for example, damage of a single supply line can deprive a wide area of a substantial source of power. When this happens, the other generating stations, which still remain connected to supply the load, become over-loaded. The overloading is accumulative and rapid with the consequent necessity for immediate opening of circuit breakers to disconnect the load. In recent years widespread loss of power of this nature, commonly referred to as a blackout, has occurred in a number of countries.

2. Prior Art

Various load management systems have been proposed to enable a utility to effect some control of power demand at consumer's premises by the transmission of control signals from the utility to effect selective switching out of loads, thereby enabling a reduction of demand to be obtained by selective switching of non-essential or less essential loads. Such techniques however are not fast enough to prevent a blackout such as has been described above.

SUMMARY OF THE INVENTION

It is one of the objects of the present invention to provide an improved method of and apparatus for safeguarding an alternating current electric power supply system against such a blackout.

The present invention makes use of the drop in the supply frequency which occurs when an alternator at a generating station becomes overloaded.

According to one aspect of the present invention, a method of safeguarding an a.c. electric power system against the effects of the power demand on the system exceeding the generating capacity comprises the steps of, for each of a plurality of consumers, sensing when the power supply frequency falls below a predetermined frequency and interrupting the power supply to at least part of the load taken by each said consumer in response to a sensed fall of frequency to below said predetermined frequency. Preferably, for each consumer, said at least part of the load is reconnected to the supply when the supply frequency rises above said predetermined frequency or above a higher frequency.

With this method, automatic disconnection of loads occurs as soon as the frequency drops below some predetermined value. It is not necessary to use the same predetermined frequency for every consumer. In general it is preferable that the load shedding is not instantaneous but occurs over a short period of time so that the system comes to a stable condition where the generating capacity can meet the connected load demand. More particularly, it is desirable that any automatic reconnection is effected gradually to prevent over-loading of the system. Thus said predetermined frequency is preferably a frequency within a predetermined frequency band or bands, with the exact frequencies differing for different consumers. It is inevitable in practice that the exact frequency of operation in any practical system will vary slightly for different consumers. With a 50 Hz supply frequency, it might be arranged that the consumers are cut out at a frequency within the range of 46.5 to 48.5 Hz. Thus, as the frequency drops, some consumers will be disconnected when the frequency falls to 48.5 and gradually more will have their switches opened as the frequency falls further: all or substantially all would have lost power by the time the frequency is down to 46.5. It is preferred to have automatic restoration of the power supply when the frequency rises and, to allow a margin to prevent switching on and off, the supply should be restored to a consumer when the frequency is slightly higher than the frequency at which it was previously cut off.

The load switching for consumers may be effected in two or more steps, switching off of part of the load occurring when the frequency has fallen to a first value and further switching being effected when the frequency falls to a second lower value.

It will be readily apparent that desirably all or substantially all consumers should have their power controlled in this way although it is obviously possible to provide safeguards for certain priority loads, such as hospitals, kidney machines etc. so that they remain connected to the supply despite the loss of frequency. Since the control means are now associated with the individual consumers and may if necessary be associated with individual loads, such priority facilities may be provided.

It has previously been proposed, see for example our U.S. patent application Ser. No. 110,027 filed Jan. 7th 1980, to effect measurement of energy consumption by a consumer supplied with alternating current power by making use of data processing means having a clock, controlling the data processing, which clock is synchronised with the incoming mains frequency. In such a system, employing a phase-lock loop to synchronise the clock frequency with the incoming mains, there is inherently a signal available representative of the incoming mains frequency or of the deviation of the mains frequency from a datum. This signal may be used for controlling the aforementioned switch or switches for interrupting the supply of the load or loads on the consumer's premises. A phase-lock loop will commonly operate only over a limited frequency range and it is convenient to make the switch means operative to disconnect the load or loads when the phase-lock loop fails to maintain phase synchronisation due to a fall in frequency. If the phase-lock loop fails to maintain synchronisation, the phase error increases rapidly and this signal may be used for effecting switch control.

According to another aspect of the invention, in an a.c. electric power supply system having generating means arranged for supplying power to a plurality of consumers, at least some of said consumers are each provided with means for sensing when the power supply frequency falls below a predetermined frequency, and switch means for each consumer arranged for interrupting the power supply to at least part of that consumer's load in response to a sensed fall of frequency to below said predetermined frequency.

Each of said at least some consumers may have means operative to reconnect said at least part of that consumer's load to the supply in response to a sensed rise of the supply frequency above said predetermined frequency at which the switch means for that consumer was operated to interrupt the supply or above a higher frequency.

The aforementioned switch means may control supply to only part of a consumer's load and further switch means may be provided operatively responsive to sensed fall of frequency to a still lower value below that at which the first-mentioned switch means is operated.

The control switches are preferably solid state switches and may be switches provided for some other purpose, e.g. for automatic control to limit maximum demand. It will thus be seen that the protection of the system against a blackout due to demand exceeding the generating capacity can readily be provided on consumers' premises with little additional equipment beyond that which is installed for other purposes.

According to a further aspect of the present invention there is provided apparatus comprising means responsive to the frequency and alternating current electric power supply being fed to a load and switch means controlling the supply to the load which switch means are operative to cut off the supply when the frequency sensed by the frequency responsive means falls below a predetermined frequency. Preferably means are provided for automatically restoring the supply when the frequency rises above said predetermined value or above a higher frequency.

The switch means conveniently comprises a solid state switch or switches. The means responsive to the frequency of the incoming supply conveniently comprises an oscillator with a phase-lock loop for maintaining the oscillator output in synchronism with the incoming mains supply, said phase-lock loop being operative to maintain phase lock over a frequency range around the nominal frequency of the supply system but to loose lock when the frequency falls below a predetermined value; in this case the switch means may be made responsive to the loss of phase-lock in the loop.

DESCRIPTION OF THE PREFERRED EMBODIMENTS

Figure 1:
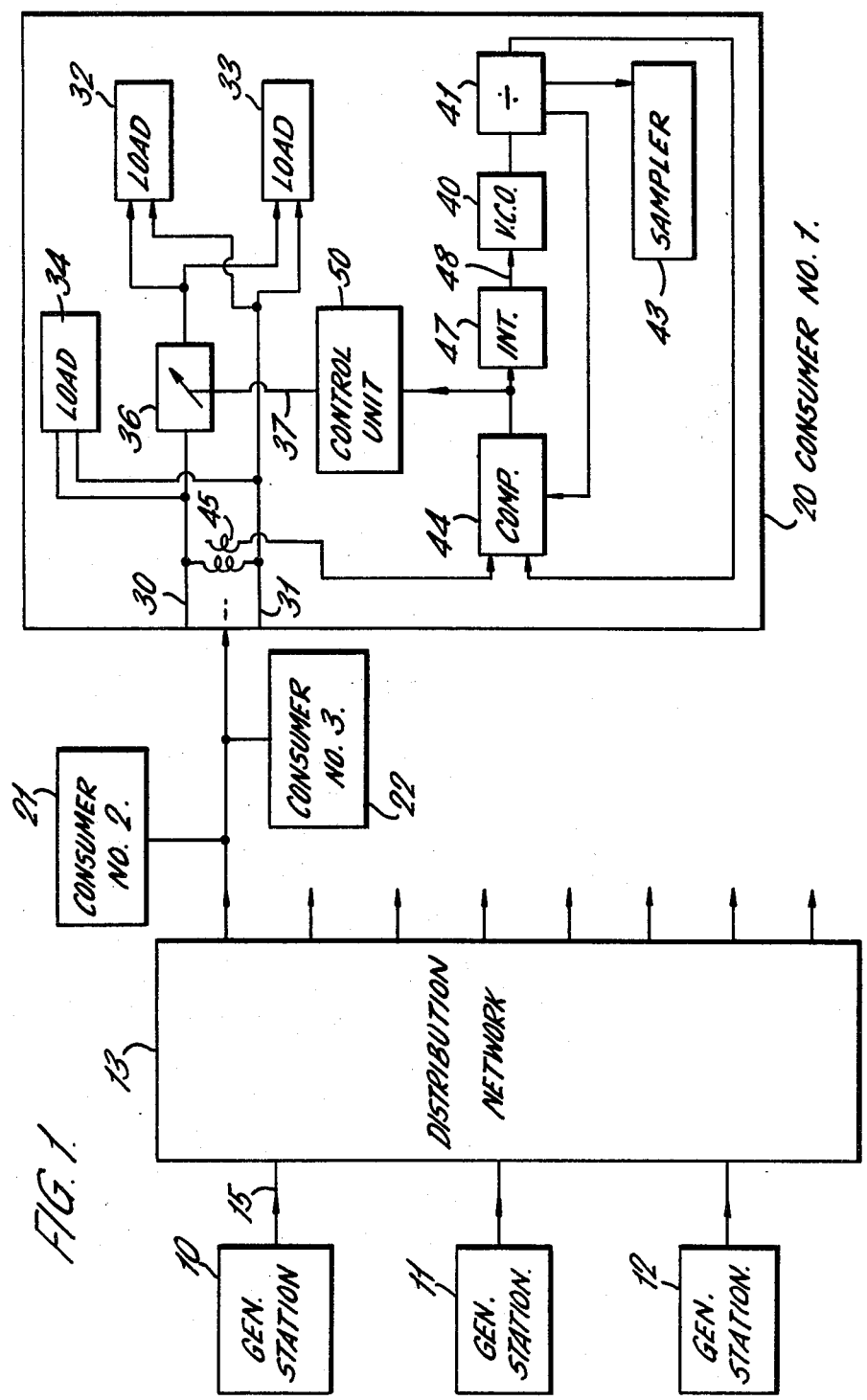
FIG. 1 is a block diagram illustrating part of an electricity supply system supplying alternating power to consumers and diagrammatically illustrating one embodiment of the invention.

Referring to FIG. 1 there is shown diagrammatically an electric power generating system having a number of generating stations 10, 11, 12 interconnected by a power distribution network indicated diagrammatically at 13 which network feeds a large number of consumers of which three are shown at 20, 21 and 22. The consumers 21, 22 are indicated only diagrammatically while consumer 20 is shown in slightly further detail as having a single phase supply on two leads 30, 31 leading to a plurality of loads shown at 32, 33 and 34. In this particular example the loads 32 and 33 constitute the main loads of the consumer 20 whilst the load 34 is a small load required for certain essential purposes and which it is required not to interrupt if possible when protecting the system against a "blackout" due for example to interruption or damage to a power line 15 connecting one of the generators 10 to the power distribution network 13. A solid state switch 36 is provided in the supply to the loads 32, 33, this switch being controlled by a switch control signal on a lead 37.

The present invention is concerned more particularly with the operation of such a switch to interrupt the power supply to consumers' loads in the event of a gross failure resulting in the power demand exceeding the generating capacity of the system. As previously explained, when this occurs, the frequency of the supply immediately begins to drop. It is convenient in the following description to refer more specifically to a supply at a nominal frequency of 50 Hz. It will be readily apparent however that similar arrangements can be employed for supplies at other frequencies, e.g. 60 Hz.

The apparatus in the consumer's premises includes a clock for digital data processing of information, which clock is normally synchronised with the incoming mains supply. This clock comprises essentially a voltage controlled oscillator 40 operating at a frequency which is a multiple of the mains supply frequency, typically several thousand times the mains supply frequency. The output of the oscillator 40, in digital form, is divided down in frequency by a digital divider 41 to provide, for example, short duration pulses to a sampler 42 for sampling the instantaneous magnitudes of the voltage and current waveforms and thereby to provide data for metering means 43 determining the energy consumption of the consumer. The divider 41 provides an output signal at the mains supply frequency in the form of short duration pulses the timing of which is compared in a comparator 44 with the time of short duration pulses at the zero voltage crossover point of the incoming voltage waveforms on lines 30, 31. For this purpose there is a voltage transformer 45 across the lines, 30, 31 having an output winding providing the voltage waveform to the comparator unit 43. The time difference determined by the comparator 43 is measured digitally utilising clock pulses from the divider 41 on a lead 46 and the digital output is a measure of the phase error between the clock frequency and the incoming waveform frequency. This phase error is integrated digitally in an integrator 47 to provide on a lead 48 the control signal for the voltage controlled oscillator 40. Such a phase control system operated to control the frequency of the oscillator 40 so that the output thereof is synchronised in phase with the incoming waveform. The phase error on the output from the comparator 43 is thus normally small so long as synchronisation is maintained. If synchronisation is lost however the phase error is increased. Loss of phase synchronisation can be arranged to occur as the frequency decreases at some predetermined frequency, for example by limiting the range of the output signal from the integrator 47. The sudden increase in phase error is applied to a control unit 50 to generate a control signal on the lead 37 for operating the switch 36 to interrupt the supply to the loads 32, 33.

It will be appreciated that there are many other possible ways in which the reduction in frequency of the mains supply can be determined and utilised to operate a switch.

Figure 2:
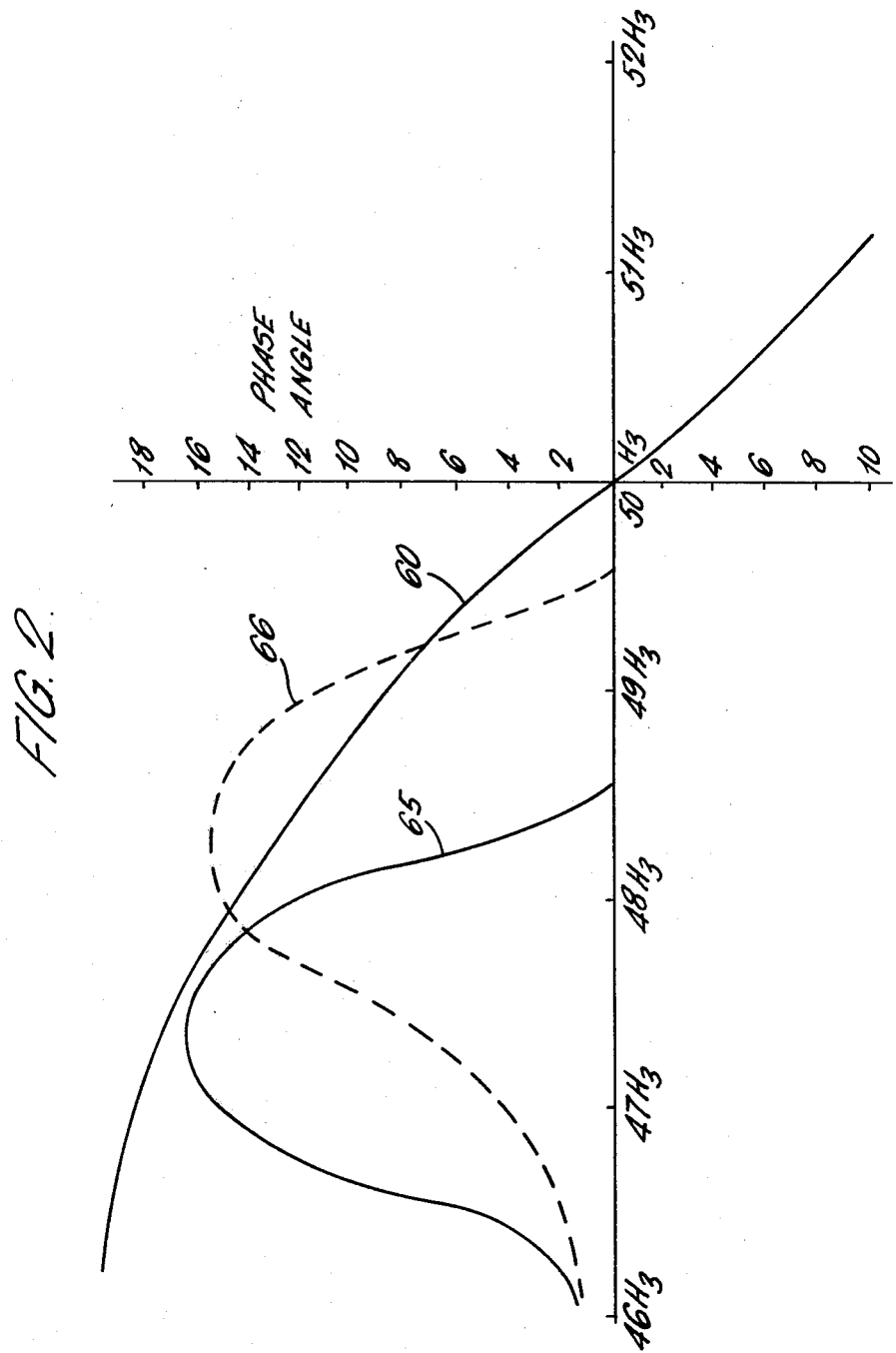
FIG. 2 is a graphical diagram for explaining the operation of part of the apparatus of FIG. 1.

FIG. 2 is a graphical diagram in which curve 60 shows the relationship between phase error (plotted as ordinates) and frequency (plotted as abscissa) for one particular form of phase-locked oscillator. As the frequency falls, the output of the oscillator gradually lags behind the incoming voltage waveform of the mains supply. At a frequency of 49 Hz, there is a phase error of 8°. The phase error is indicative of the control signal applied to the aforementioned voltage control oscillator 40. When some particular phase error has been reached, depending on the design of the equipment, the phase-lock loop will no longer be able to hold the frequency to give phase-lock with the incoming waveform. When this occurs, the phase error determined by the comparator 43 will increase and the switch 36 will be operated.

It is envisaged that, in general, all consumers should have a control for cutting off the load when the frequency drops, similar to that shown for consumer 20 of FIG. 1. It is inevitable that the tolerances of the components in the phase-lock systems for different consumers will give some spread to the frequency at which the various switches 36 will operate. In a typical system, the spread might be over 2 Hz, e.g. from 46.5 Hz to 48.5 Hz with half the consumers losing power when the frequency has dropped to some intermediate value, typically 47.25 Hz. In FIG. 2 a curve 65 is shown which is a distribution curve indicating the proportions of consumers which will lose lock at any particular frequency in the frequency range. It will be seen that all consumers remain in lock at frequencies above 48.5 Hz but, when the frequency is down to 46 Hz only a small proportion, about 5%, will be left on. This curve makes allowance for the fact that certain consumers or certain individual loads will not be switched off by the drop in frequency, their supplies being maintained for safety or other reasons. It may be that some consumers will have their phase-lock loops set to maintain phase down to significantly lower frequencies than others.

It will be immediately apparent that, in the event of some gross loss of power in the generating system, the resultant drop in frequency will immediately cause switches 36 at the various consumers to be opened so as to reduce load. In general the reduction in load will readily be made sufficient to maintain stability of the system provided some significant generating capacity still remains.

If the generating capacity is restored or if there is disconnection of loads still being fed with power, the frequency of the system will tend to rise. With the form of phase-lock loop described above for the consumer 20, when the frequency becomes sufficiently high, phase synchronisation will be re-established and hence the signal to the control unit 50 will be removed. In general, automatic restoration of the supply to the loads by closing the switch 36 would be effected by the control unit 50. Provision may be made however, for example, for automatic restoration of supply to certain loads but for restoration of supply to other loads only on manually resetting switches. Because of the inherent hysteresis effect in the control loop, the frequency at which the restoration of power occurs will be higher than the frequency at which the power was switched off. The dashed line curve 66 illustrates, for the particular embodiment under consideration, the numbers of consumers which will have power restored at the various different frequencies as the frequency rises. It will be noted that the frequency must rise to at least 49.5 Hz before the last load is restored. However restoration of loads commences as soon as the frequency begins to rise.

In the above-described embodiment of the invention, the failure of a phase-lock loop to maintain phase-lock between a clock signal generator and the incoming waveform has been utilised to control the switching. Such a phase-lock loop controlling a clock signal generator may form part of equipment for metering the power consumption of the individual consumer, as for example is described in the specification of application Ser. No. 110027. The switch 36 may be a switch utilised also for load management, e.g. for the automatic regulation of the maximum demand by the consumer, utilising automatic maximum demand regulating apparatus. It will thus be seen that the protection for the system against a large-scale blackout due to for example sudden loss of generating capacity, can be obtained with very little additional equipment on the consumer's premises beyond that which may be installed for other purposes. The protection for the system is obtained by switching at the consumer's premises. No signalling over the transmission lines or by other means is required and there is no need to provide any special equipment at the generating stations or on the network apart from the equipment on the consumer's premises.

Figure 3:
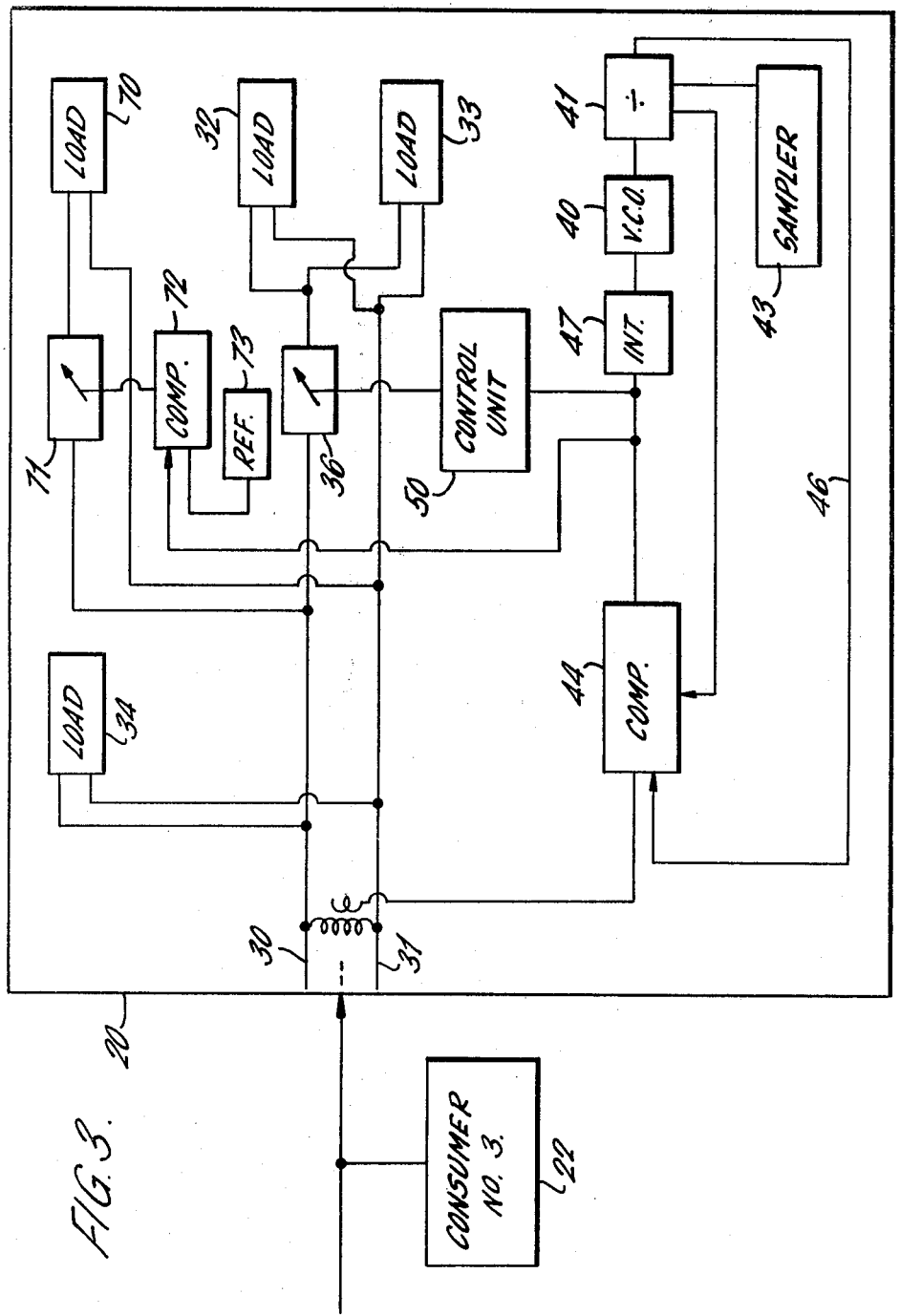
FIG. 3 illustrates a modification of part of the apparatus of FIG. 1.

In FIG. 3, there is shown a modified form of part of the apparatus of FIG. 1 in which the switching off of parts of the load at a consumer's premises occurs in two stages. In FIG. 3, the same reference characters are used as in FIG. 1 to denote corresponding components and mention will be made only of the distinctive features of FIG. 3. The consumer is shown as having a further load 70 which is of low priority. A triac switch 71 for cutting off the supply to this load 70 is controlled by a comparator 72 comparing the voltage output from the comparator 44 with a reference voltage from a reference source 73. This reference voltage is chosen so that the switch 71 is operated to cut the supply to load 70 when the frequency has fallen to some predetermined value intermediate between the normal supply frequency and the frequency at which the switch 36 operates. Partial load shedding in this way by a large number of consumers may often be sufficient to prevent any further frequency drop but the switches 36 would be operative in the event of serious overloading of the supply network.

We claim:

1. A method of safeguarding an a.c. electric power supply system against the effects of power demand on the system exceeding the generating capacity of the system comprising the steps of, for each of a plurality of consumers, sensing when the power supply frequency falls below a predetermined frequency by using a phase-lock loop arranged for synchronizing an oscillator with the power supply frequency, the phase-lock loop being arranged to lose phase lock when the power supply frequency falls below the predetermined frequency, sensing the loss of phase lock to provide a control signal, and interrupting the power supply to at least part of the load taken by each said consumer in response to said control signal indicating a fall of frequency to below said predetermined frequency.

2. A method as claimed in claim 1 wherein, for each consumer, said at least part of the load is reconnected to the supply when the frequency of the supply frequency rises above said predetermined frequency or above a higher frequency.

3. A method as claimed in claim 1 wherein said predetermined frequency is a frequency within a predetermined frequency band or bands, with the exact frequency differing for different consumers.

4. A method as claimed in claim 1 wherein the load switching for consumers is effected in two or more steps, switching off of part of the load being effected when the frequency has fallen to a first value and further switching being effected when the frequency has fallen to a second lower value.

5. An a.c. electric power supply system having generating means arranged for supplying power to a plurality of consumers wherein at least some of said consumers are each provided with means for sensing when the power supply frequency falls below a predetermined frequency, said means for sensing a fall in frequency comprising an oscillator, a phase-lock loop arranged for symchronizing the oscillator with the power supply frequency, the phase-lock loop being arranged to lose phase lock when the supply frequency falls below the predetermined frequency, and means operatively responsive to loss of phase lock of the loop to provide a control signal, and switch means operatively responsive to the control signal and arranged for interrupting the power supply to at least part of that consumer's load in response to a sensed fall of frequency to below said predetermined frequency.

6. An a.c. electric power supply system as claimed in claim 5 wherein each of said at least some consumers has means operative to reconnect said at least part of that consumer's load to the supply in response to a sensed rise of the supply frequency above said predetermined frequency at which the switch means for that consumer was operated to interrupt the supply or above a higher frequency.

7. An a.c. electric power supply system as claimed in claim 5 wherein the switch means are solid state switches.

8. Apparatus for use by a consumer using power from an a.c. electric power supply system comprising means responsive to the frequency of the alternating current electric power supply being fed to a load and switch means controlling the supply to the load which switch means are operative to cut the supply when the frequency sensed by the frequency responsive means falls below a predetermined frequency, said means for sensing when the power supply frequency falls below a predetermined frequency comprising a phase-lock loop for maintaining the output of an oscillator in phase synchronization with the alternating current electric power supply, said phase-lock loop being operative only to maintain synchronization when the power supply frequency is above said predetermined frequency, and means for sensing loss of phase lock.

9. Apparatus as claimed in claim 8 and having means for automatically restoring the supply to said load when the frequency of the supply rises to a value above said predetermined frequency.

10. Apparatus as claimed in claim 9 wherein said switch means controls the power supply to part of a consumer's load and having further switch means operative at a different frequency for controlling the power supply to another part of the consumer's load.

* * * * *